(12) United States Patent
DiEsposti et al.

(10) Patent No.: US 7,668,629 B2
(45) Date of Patent: Feb. 23, 2010

(54) ULTRA-TIGHTLY COUPLED GLOBAL NAVIGATION SATELLITE SYSTEM SPACE BORNE RECEIVER SYSTEM

(75) Inventors: Raymond S DiEsposti, Lakewood, CA (US); Jonathan A Tekawy, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/566,923

(22) Filed: Dec. 5, 2006

(65) Prior Publication Data

US 2008/0133135 A1   Jun. 5, 2008

(51) Int. Cl.
*B64G 3/00* (2006.01)
*G01C 21/00* (2006.01)

(52) U.S. Cl. .............................. 701/13; 701/4; 701/226; 342/357.14; 342/358

(58) Field of Classification Search .................... 701/13, 701/4, 217, 220, 300; 342/357.11, 357.6, 342/357.12, 357.14, 357.16, 358
See application file for complete search history.

(56) References Cited

U.S. PATENT DOCUMENTS 5,657,025 A * 8/1997 Ebner et al. ................. 701/300
5,909,381 A   6/1999 Shome et al.
6,473,034 B2 * 10/2002 Lin et al. ................ 342/357.14
6,516,021 B1  2/2003 Abbott et al.
2002/0008661 A1  1/2002 McCall et al.
2006/0074558 A1 *  4/2006 Williamson et al. .......... 701/213

FOREIGN PATENT DOCUMENTS

EP   1857833 A1   11/2007

OTHER PUBLICATIONS

J.A. Tekawy, Precision Spacecraft Attitude Estimators Using an Optical Payload Pointing System, Journal of Spacecraft and Rockets, vol. 35, No. 4, Jul.-Aug. 1998, pp. 480-486.

* cited by examiner

*Primary Examiner*—Tan Q Nguyen
(74) *Attorney, Agent, or Firm*—Brosemer, Kolefas & Assoc. LLC

(57) ABSTRACT

A GNSS ultra-tight coupling (UTC) receiver architecture applicable to space borne orbit platforms is described. A receiver in accordance with this architecture retains the rotational motion sensors typically found in an inertial measurement unit (IMU) of a conventional UTC receiver, but replaces the IMU accelerometer sensors with precise orbital dynamics models to predict the translational motion of the platform center of gravity (CG). Drag and radiation pressure may be modeled as well. The various models can be implemented in software. The IMU rotational sensors are retained for compensation of the GNSS antenna lever arm effect due to platform rotation.

23 Claims, 3 Drawing Sheets

ULTRA-TIGHTLY COUPLED GLOBAL NAVIGATION SATELLITE SYSTEM SPACE BORNE RECEIVER SYSTEM

FIELD OF THE INVENTION

The present invention relates generally to Global Navigation Satellite Systems (GNSS) methods and systems, and particularly to ultra-tightly coupled (UTC) GNSS receiver systems for space platform user applications.

BACKGROUND INFORMATION

A Global Navigation Satellite System (GNSS), such as the Global Positioning System (GPS), typically comprises a constellation of navigation satellites in Medium Earth Orbit, a ground Control Segment that controls these satellites, and user equipment (UE). The navigation satellites broadcast precisely synchronized ranging signals. The GNSS UE acquire and lock on to the signals from multiple satellites, make precise ranging measurements to the satellites, apply corrections, and apply navigation filter algorithms to solve for the UE position, velocity and time (PVT).

GNSS UE can also operate in the space environment, such as on board satellites. The space environment often creates additional challenges to GNSS UE operation compared to terrestrial UE applications, including: continuous and wide ranges of platform rotational motions, intermittent antenna visibility to individual GNSS satellites, reduced availability of GNSS signals, weaker received GNSS signals, high relative velocities and Doppler effects, larger relativistic effects, larger signal dynamic range, and increased sensitivity to timing errors.

GPS/INS ultra-tight coupling (UTC) is a methodology of integrating GPS and inertial navigation system (INS) instruments to enhance UE robustness and anti-jam (AJ) performance. In a GPS/INS UTC implementation, all of the GPS correlator signal measurements associated with each pseudorandom (PRN) code ranging signal are provided to a UE error state Kalman navigation filter. The Kalman filter provides updates to the UE Position-Velocity-Time (PVT) state errors, and the GPS signal tracking loops are closed through the INS and Kalman filter processing.

The GPS Modernized Space Receiver (MSR) program is aimed at developing the next generation space receiver which will be capable of operating with legacy civilian coarse acquisition code (C/A-code), L2 civil code (L2C), and military encrypted precision code (P(Y)-code) GPS signals as well as the new military code (M-code), L5 civil code, and L1 civil code (L1C) GPS signals. Such a receiver must also be able to operate in the space environment for the design life of the host satellite (e.g., ten or more years), have some anti-jam capabilities and meet certain objective tracking requirements. UTC has been proposed as an MSR architecture solution.

U.S. Pat. No. 6,516,021 describes a GPS/INS ultra-tight coupling UE and assumes the use of a complete INS that includes both translational and rotational motion sensors as needed in order to sense and predict the motion of terrestrial based platforms whose acceleration or jerk and rotation are unpredictable.

The use in GPS/INS UTC space borne UE of inertial measurement unit (IMU) accelerometer instruments, such as for sensing translational motion, entails substantial costs, including the cost of space qualifying the associated electronics.

Conventional non-UTC GPS UE which implement random motion models for acceleration or jerk can introduce significant error for rotating satellites, especially if no correction is applied to relate the satellite center of gravity (CG) location to the GPS solution as computed for measurements made at the GPS antenna.

Conventional GPS UTC IMU implementations, such as described in U.S. Pat. No. 6,516,021 compute a PVT solution at the location of the IMU, which is generally not at the platform CG location. The traditional UTC antenna lever arm (ALA) correction relates the GPS antenna phase center (APC) location to the IMU location. For satellite applications, however, the PVT solution of the satellite CG trajectory is required for precise orbit determination applications.

U.S. Pat. No. 5,909,381 describes the use of on-board force models to predict GPS satellite orbital CG motion. The subject matter of U.S. Pat. No. 5,909,381, however, does not attempt to correct the satellite orbit prediction using state error models with GPS receiver measurements of L-band ranging signals broadcast by the GPS satellites. In addition, U.S. Pat. No. 5,909,381 is specific to GPS satellite applications. The use of GPS receivers on GPS satellites is generally not practical because of the jamming of the receiver due to the proximity of the satellite transmitter and GPS radio frequency (RF) signal radiator.

SUMMARY OF THE INVENTION

The present invention provides a new ultra-tight coupling (UTC) Global Navigation Satellite System (GNSS) receiver system for space-borne applications. In an exemplary embodiment of the present invention, precise orbital dynamics models and orbit propagators or Keplerian models replace and/or modify some of the traditional elements of conventional UTC user equipment, such as translational motion sensors and associated inertial navigation system (INS) processing. Using precise orbital dynamics models coupled with modified INS processing and Kalman filter models, embodiments of the present invention provide robust operation and precise position, velocity and time (PVT) determination in the unique environment of space, while enjoying high sensitivity for weak signals, good anti-jam performance, low cost, and high accuracy. Moreover, the use of precise orbital models in accordance with the principles of the present invention enables substantial performance improvement benefit, including the ability to accurately propagate the platform trajectory without GNSS measurements to an accuracy of about one meter per hour compared to a high-grade avionics INS quality of one nautical mile per hour.

An exemplary embodiment of the present invention achieves the above attributes by modifying the traditional GPS/INS UTC UE architecture by retaining the rotational sensor IMU instruments (e.g. gyro assembly) while replacing the translational motion IMU instruments (e.g. accelerometer assembly) with precise orbit dynamics models implemented in software. The use of orbital dynamics models and rotational sensors allows precise motion prediction for high accuracy for the case of sparse GNSS measurements, precise prediction of the GNSS antenna phase center (APC) motion to enable long coherent integration times to enhance signal-to-noise ratio (SNR) for weak signal processing, enhanced signal processing for other on-board sensors, and long-duration precise orbit propagation in the case of GNSS measurement outages.

In a further aspect, a receiver in accordance with the present invention uses precise orbital dynamics models to predict the motion of the center of gravity (CG) of the platform, on which it is carried. Precise orbit determination of rotating satellites requires knowledge of the trajectory of the satellite CG.

Furthermore, the use of precise orbital models enables a capability that exceeds the terrestrial-based performance of GPS/INS UTC UE for high sensitivity and high anti-jam requirements. Precise orbital dynamics models which are calibrated while GNSS measurements are available (e.g. drag and radiation pressure models) can enable very accurate orbit determination and propagation of the orbital motion for long durations of GNSS measurement outages or when only sparse measurements are available (e.g. for a satellite platform in geosynchronous orbit).

Because only a few hardware elements of the traditional UTC architecture are impacted, e.g. replacement of the IMU linear motion sensors by the precise orbital dynamics models, much of the remainder of the conventional GPS UTC UE hardware for terrestrial platforms can be re-used in an exemplary receiver system of the present invention with most of the modifications (e.g., Kalman filter, INS processing) being implementable in software.

The aforementioned and additional features and advantages of the present invention are further described below.

DETAILED DESCRIPTION

Figure 1:
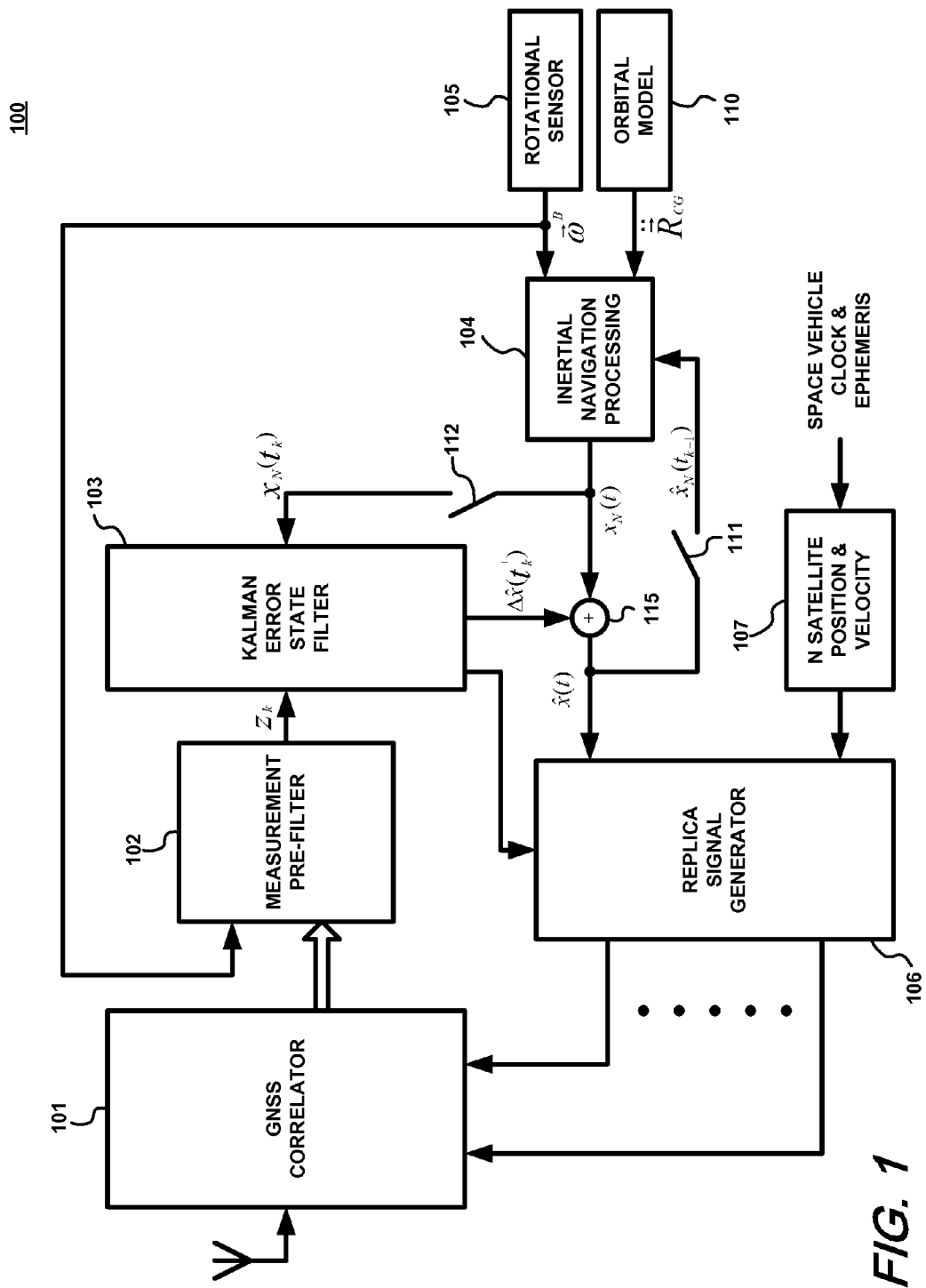
FIG. 1 is a block diagram of an exemplary embodiment of a GNSS receiver in accordance with the present invention.

FIG. 1 shows a block diagram of an exemplary embodiment of a Global Navigation Satellite System (GNSS) receiver 100 in accordance with the present invention for use in a space platform, such as a satellite, for example. The vehicle which carries the receiver 100 will be referred to herein as the platform. The exemplary GNSS receiver 100 comprises a GNSS correlator block 101, a measurement pre-filter block 102, a Kalman error state filter block 103, an inertial navigation processing block 104, a rotational sensor block 105, an orbital model block 110, a replica signal generator block 106, and a satellite position and velocity block 107. The GNSS receiver 100 employs several of the same elements as a conventional GPS/INS UTC UE, such as described in U.S. Pat. No. 6,516,021, including blocks 101-107. U.S. Pat. No. 6,516,021 is hereby incorporated by reference in its entirety into the present Patent Application. As will be described in greater detail below, however, the inertial navigation processing block 104 is substantially modified and the orbit model block 110 is entirely new to the exemplary receiver 100 of the present invention. In an exemplary embodiment, the orbital model block 110 comprises an all-software replacement to the traditional UTC accelerometer instruments and associated INS processing.

Moreover, while the Kalman error state filter block 103 can be implemented using known structures, an implementation of this block described in greater detail below incorporates system and measurement models that are specially adapted in accordance with the present invention.

As in a conventional receiver, the GNSS correlator block 101 correlates the GNSS signals captured by the receiving antenna with signals and PRN codes generated internally within the receiver by the replica signal generator block 106. When the generated signals are relatively in-phase with the received signals, the outputs of the correlator block 101 will indicate the presence of in-phase signal power and in-phase and quadrature-phase error channel measurements are then formed for output to the measurement pre-filter block 102. The pre-filter block 102 accepts the in-phase and quadrature-phase measurement data, which is generated at a relatively high rate, and smooths this data to generate lower rate data for the Kalman error state filter block 103.

The "nominal" motion (i.e., position, velocity and rotation) of the platform is predicted by the inertial navigation processing block 104 based on outputs of the rotational sensor block 105 and the orbit model block 110. The orbit model block 110 predicts the acceleration of the platform CG ($\vec{R}_{CG}$) based on the various forces to which the platform is subjected. As described in greater detail below, the inertial navigation processing block 104 numerically integrates the rotational motion sensed by the sensors of block 105 and the modeled translational motion generated by the orbit model block 110 to determine velocity and position of the platform center of gravity (CG) and preferably the attitude of the platform, as well. Additional external sensor measurements may also be incorporated to improve observability of the vehicle attitude, such as, for example, star sensor angular measurements. The Kalman filter block 103 generates corrections to the nominal motion and updates models of GNSS and INS measurement errors to provide a more accurate measure of the actual motion.

Using the nominal platform motion $x_N(t)$ as predicted by the inertial navigation processing block 104, information from the satellite position and velocity block 107, and motion corrections $\Delta\hat{x}(t_k^+)$ from the Kalman filter 103, the replica signal generator block 106 provides predictions of the GNSS signals to the correlator block 101 for GNSS signal tracking. The satellite position and velocity block 107 generates the GNSS satellite position and velocity information and also the GNSS satellite clock corrections as a function of GNSS time for the "N" GNSS satellites based on information obtained from NAV messages transmitted by the N GNSS satellites. The replica signal generator block 106 uses the N satellite information to steer the replica signals to compensate for the effect of the GNSS satellites' motion. Such compensation for GNSS satellite motion and user platform motion enables longer coherent integration times for improved weak signal performance.

The GNSS NAV messages provide GNSS satellite clock and ephemeris data which allows the GNSS receiver 100 to precisely predict the N satellites' orbital motion and clock correction as a function of GNSS time. This information is also used by the Kalman filter 103 to solve for the UE platform motion. Knowing the GNSS satellite locations (i.e., ephemeris) and clocks, the ranges between the UE platform and the GNSS satellites can be estimated. Having the estimated ranges, the UE platform location can be estimated.

Unlike a conventional GPS/INS UTC UE, the receiver 100 replaces the inertial measurement instruments that sense translational motion (e.g., accelerometers) with precise orbit models to predict the CG motion of the platform carrying the UE. Thus, whereas a conventional UE may have an inertial measurement unit (IMU) with rotational as well as translational motion sensors, the receiver 100 of the present invention comprises the rotational motion sensors 105, such as one or more gyroscopes, and the orbit model block 110. Preferably, the orbital dynamics models (e.g., radiation pressure and drag) are precisely calibrated by the Kalman filter block 103 in accordance with actual GNSS and rotational sensor measurements to enable very accurate long-duration prediction intervals of the platform CG motion, even if GNSS signals are temporarily unavailable, such as due to jamming.

Moreover, the use of precise orbit models in accordance with the present invention enables much more accurate prediction of orbital motion than is possible with IMU instruments.

Additionally, an exemplary embodiment of the present invention takes into account the antenna lever arm (ALA) effect which is due to the motion of the GNSS antenna phase center (APC) with respect to the platform CG. The compensation for ALA in accordance with the present invention is described in greater detail below.

The rate at which the outputs of the blocks 105 and 110 and the prediction of the nominal platform position and velocity by block 104 and the GNSS satellite position and velocity by block 107 are updated should be high enough to provide steering by the replica signal generator block 106 to maintain code and carrier loop coherency within the GNSS correlator block 101, in light of the platform and GNSS satellite motion, over the coherent integration interval (e.g., $\geq$100 Hz). The platform position and velocity errors, however, are generally small and change more gradually. Thus the Kalman error filter block 103 can operate at much lower rates (e.g., 1 Hz). For some applications, approximations, such as curve fits, can be used to significantly reduce the rate of INS processing block 104. The actual update rates required will depend on the platform motion rates, the ability to approximate the nominal motion, such as by using curve fits, and the need to maintain GNSS loop coherency. If curve fit approximations are utilized, however, the effects of any significant curve fit errors would need to be included in the Kalman error state filter block 103.

As can be appreciated by those of ordinary skill in the art, the various computational blocks, such as 103, 104 and 110 can be implemented using software, firmware, dedicated hardware, a combination thereof, or the like.

The operation of the exemplary receiver 100 and implementations of the Kalman error state filter block 103, the inertial navigation processing block 104, and the orbital model block 110, are described below in greater detail.

INS Processing and Kalman Error State Filter

In an exemplary embodiment of the present invention, the Kalman error state filter 103 estimates the error in a nominal state vector relative to a true state and is linearized about a nominal state trajectory. For this problem, the state vector is selected as follows:

$$x(t) = [\vec{R}_{CG}, \vec{V}_{CG}, \vec{\theta}, \vec{\omega}, \vec{b}_u, \vec{g}_B, A_D, A_{RP}, \vec{r}_{ALA}^B]$$

The state vector x(t) includes: platform CG position and velocity vectors, $\vec{R}_{CG}$ and $\vec{v}_{CG}$; platform attitude angle and rotation vectors $\vec{\theta}$ and $\vec{\omega}$; a UE clock correction vector $\vec{b}_u$ (including clock bias, rate error, etc); a rotational sensor, or gyro bias vector $\vec{g}_B$; drag and radiation pressure model parameters $A_D$ and $A_{RP}$, respectively; and an antenna phase center lever arm (ALA) vector in platform body coordinates $\vec{r}_{ALA}^B$.

The state vector can be expanded to include other states or more complex error models. For example, without loss of generality, the gyro error models can be expanded to include short-term and long-term drift parameters, axes misalignments, and scale factor parameters.

At any given time, the Kalman filter's "best" estimate $\hat{x}(t)$ of the state vector x(t) is the sum of a nominal state vector, denoted by $x_N(t)$, and an error state vector, denoted by $\Delta\hat{x}(t)$, i.e.:

$$\hat{x}(t) = x_N(t) + \Delta\hat{x}(t) \quad (1)$$

The nominal state vector is updated at a relatively high rate (e.g., $\geq$100 Hz) whereas the error state vector can be updated at a substantially slower rate (e.g., ~1 Hz). For some applications, a reduction in the update rate of the nominal state vector computation is possible using curve fit approximations to the nominal motion.

In an exemplary embodiment, the Kalman filter block 103 follows a continuous-time system model and discrete-time measurement model formulation. Such formulations are described in *Applied Optimal Estimation*, Arthur Gelb, The Analytical Sciences Corporation, 1974. Square root implementations enable enhanced numerical stability, and nonlinear filter implementations may improve performance.

The system and measurement models for the error state vector are derived by linearizing the nonlinear system and measurement equations. The system model can be expressed as follows:

$$\dot{x} = f(x) + w, \quad (2)$$

and the measurement model can be expressed as follows:

$$z = h(x) + v. \quad (3)$$

In equations (2) and (3), the vector functions $f(x)$ and $h(x)$ represent the non-linear dynamics and measurements models, respectively, and the vectors w and v represent the process noise for the system and measurement noise models, respectively.

Combining Eqs. 1-3, linearizing about the nominal state, and breaking up the result into nominal and error state relationships yields the following nominal state system model:

$$\dot{x}_N(t) = f(x_N), \quad (4)$$

and the following error state system model:

$$\Delta\dot{x} = F(x(t)) \cdot \Delta x + w, \text{ where } F = \frac{\partial f}{\partial x}. \quad (5)$$

A discrete-time error state measurement model can be expressed as follows:

$$\Delta z_k = z_k - h(x_N(t_k)) = H(x_N(t_k)) \cdot \Delta x + v, \text{ where } H = \frac{\partial h}{\partial x}. \quad (6)$$

Eq. 4 is numerically integrated (such as by the inertial navigation processing block 104 of FIG. 1) starting from an initial state to generate the nominal state vector $x_N(t)$ which is used to linearize the error state models given by Eqs. 5 and 6. The Kalman filter block 103 propagates the error state and covariance matrix associated with Eqs. 5 and 6. For improved accuracy, the Kalman filter block 103 could implement a numerical integration algorithm for propagation of the error state as suggested by Eq. 5. This numerical integration algorithm should use small enough time steps to incorporate the velocity error fluctuations due to rotation. Small or adaptable step sizes may also be used for solar eclipse (i.e., solar force model) transition events.

A state transition matrix for use in propagating the covariance matrix may be approximated by:

$$\Phi \approx I + F\Delta t. \quad (7)$$

Preferably, the nominal state vector and state error vector are periodically reset to prevent the build-up of linearization errors:

$$\chi_N(t_k) \leftarrow \chi_N(t_k) + \hat{x}(t_k^+) \quad (8)$$

$$\Delta \hat{x}(t_k^-) \leftarrow 0 \quad (9)$$

In the exemplary embodiment of FIG. 1, the periodic resetting of the nominal state vector is represented by the switch 111.

System Dynamics Model

Figure 2:
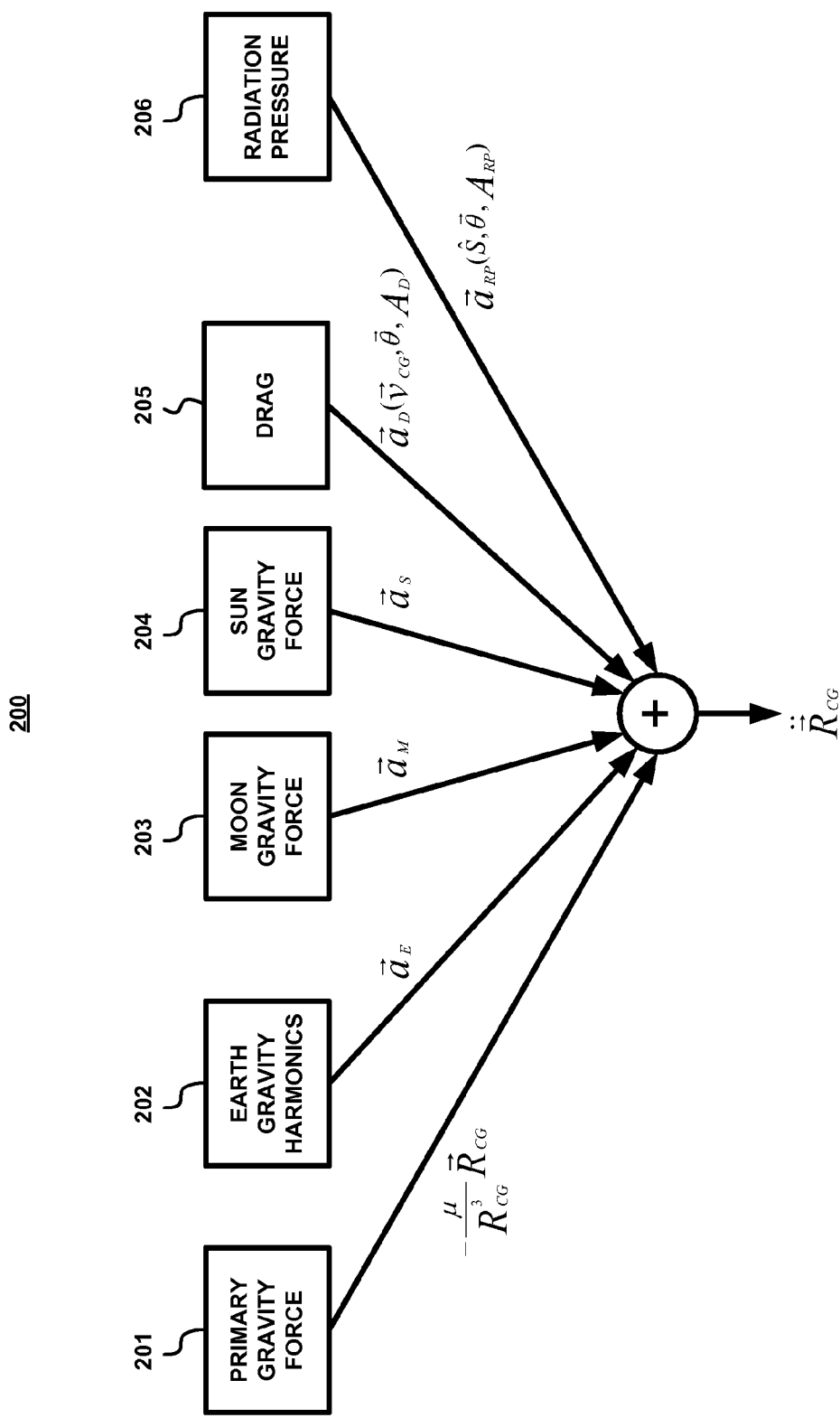
FIG. 2 is a block diagram of an orbit force model block for use in the exemplary GNSS receiver of FIG. 1.

In an exemplary embodiment, the system model comprises the kinematics and dynamics equations associated with the platform CG acting under the forces of orbital motion, the kinematics equations which relate the CG to the GNSS antenna phase center (APC), and the kinematics equations which describe the platform rotation about its CG. These equations are modeled by block 110 and block 104 of FIG. 1, whereas the Kalman error state filter block 103 incorporates the linearized system and measurement models. An exemplary implementation of block 110 is shown in greater detail in FIG. 2, whereas an exemplary implementation of block 104 is shown in greater detail in FIG. 3.

The motion of the platform CG can be expressed in an Earth Centered Inertial (ECI) coordinate system as follows:

$$\dot{\vec{R}}_{CG} = \vec{v}_{CG} \quad (10)$$

$$\dot{\vec{v}}_{CG} = \ddot{\vec{R}}_{CG} = -\frac{\mu}{R_{CG}^3} \vec{R}_{CG} + \vec{a}_E + \vec{a}_M + \vec{a}_S + \vec{a}_D(\vec{v}_{CG}, \vec{\theta}, A_D) + \vec{a}_{RP}(\hat{S}, \vec{\theta}, A_{RP}) \quad (11)$$

The first term in Eq. 11 is the two-body dominant acceleration term due to primary earth gravity (block 201 in FIG. 2), followed by the earth harmonics terms (202) which are a function of latitude, longitude, and altitude. The third and fourth terms are due to gravity forces of the moon (203) and sun (204), respectively. (Because the earth is also under the influence of the gravity of the moon and sun and the platform motion is relative to the center of the earth, these forces should only consist of the differences between the accelerations exerted on the platform and that exerted on the earth). The fifth term $\vec{a}_D$ is the acceleration due to drag (205), which is a function of the velocity squared, air density, attitude of the platform $\vec{\theta}$ and drag model parameters $A_D$ (which depends on the ballistic coefficient). The last term $\vec{a}_{RP}$ is the radiation pressure (206) as a function of the sun line direction, attitude of the platform, reflectivity and radiation pressure model parameters $A_{RP}$ (which depends on area). Generally, drag acts in the opposite direction to velocity and radiation pressure acts in the direction opposite to the vector from the platform to the sun. The radiation pressure force should be set to zero during a period of total eclipse of the sun by the earth. Additional or modified parameters may be included to improve performance of the solar pressure model during the eclipse transition region. The fidelity of the drag and radiation pressure model parameters will depend on each application. Simple models can consist of three parameters for each, e.g. a coefficient proportional to the effective area/mass ratio normal to each of the platform body axes. In general, these nominal parameters will change with time as propellant mass is consumed, and the nominal ALA vector will also change, but this effect can be incorporated into nominal parameter model databases. Complex models can involve many parameters. Some applications may include other smaller effects, e.g. earth tidal models. A random force due to outgassing may also be added if warranted.

When GNSS measurements are available, the Kalman filter can update the drag and radiation pressure model parameters in the same way that accelerometer model error parameters are updated in a traditional GPS/INS UTC implementation. When GNSS measurements are not available, the updated, calibrated radiation pressure and drag models can enable precise orbit propagation for long measurement outage intervals, e.g. one-meter error per hour.

Figure 3:
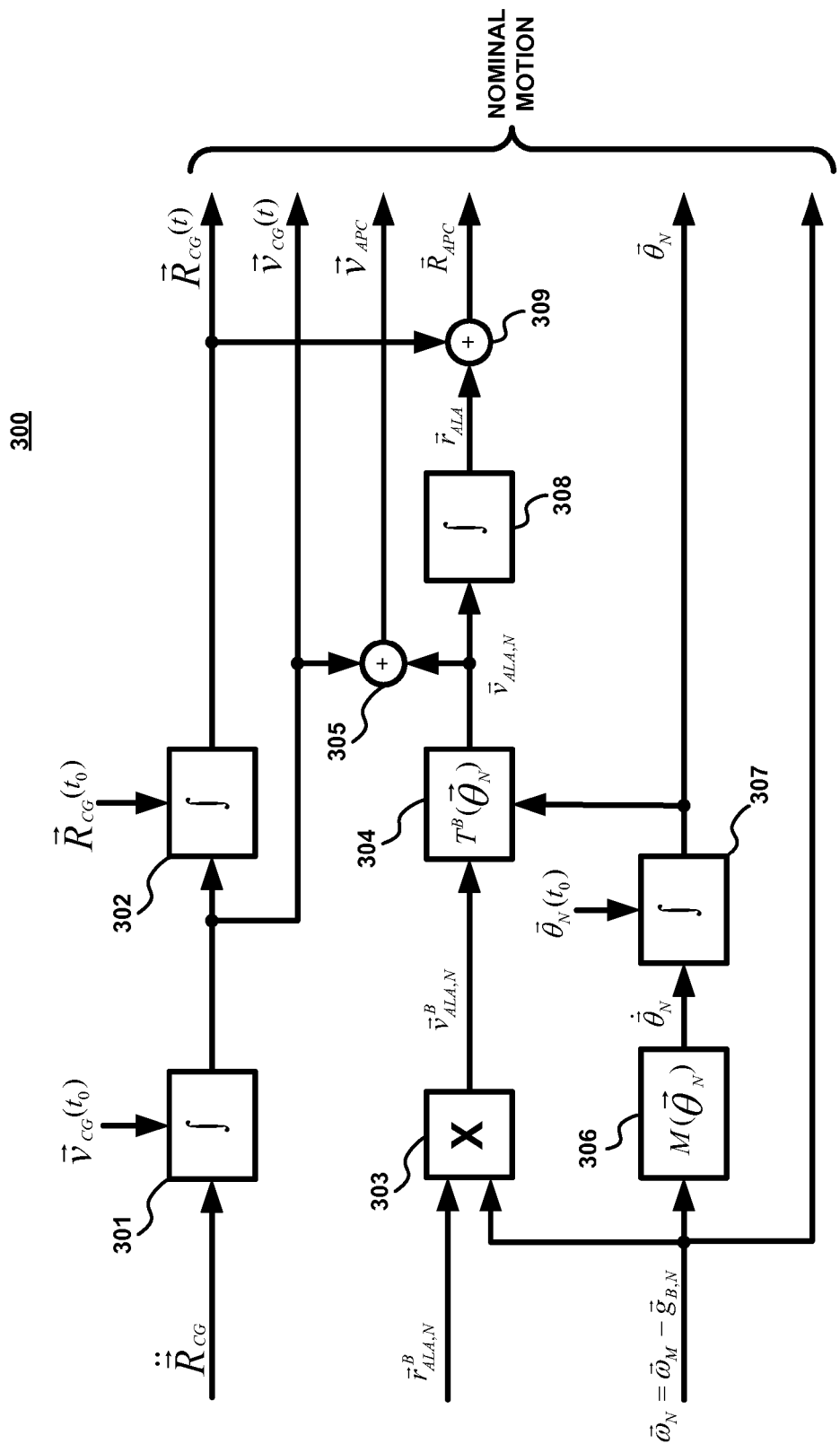
FIG. 3 is a block diagram of an inertial navigation processing block for use in the exemplary GNSS receiver of FIG. 1.

FIG. 3 is a block diagram of an exemplary implementation 300 of the inertial navigation processing block 104 of FIG. 1. As described above, the inertial navigation processing block receives rotational sensor information from block 105 and translational acceleration information from orbit model block 110 to generate a nominal motion of the platform CG and GNSS APC.

As shown in FIG. 3, block 301 integrates the platform CG acceleration $\ddot{\vec{R}}_{CG}$, as determined by the orbital dynamics block 110 (of FIG. 1, or block 200 of FIG. 2), to generate the nominal platform CG velocity $\vec{v}_{CG}(t)$. Block 302 further integrates the CG velocity to generate the nominal CG position $\vec{R}_{CG}(t)$.

As mentioned, whereas the translational motion sensors are eliminated, the receiver 100 retains the IMU rotational motion sensors. Advantageously, space qualified gyroscopic rotational motion sensors are readily available, such as, for example, the space inertial reference unit (SIRU) from Northrop Grumman, described at http://www.nsd.es-.northropgrumman.com/Automated/products/SIRU-Dual.html. Using the rotational sensors allows for compensation of the so-called "antenna lever arm effect." This complexity arises because the GNSS antenna phase center (APC) is typically located at an offset to the platform CG. If the GNSS antenna is rotating about the platform CG (e.g., a spinning satellite), then the GNSS measurements should be adjusted by the rotating antenna lever arm (ALA) effect. Even if the platform is not rotating, the platform CG will generally have a different gravitational force potential than the location of the APC.

A typical satellite will have one or more GNSS antennas, with the antenna phase center (APC) of each antenna being at some distance from the satellite's CG. For multiple-antenna configurations and high-precision applications, multiple ALA vectors should be modeled along with multiple group delay parameters associated with the different time delay between each APC location and the centralized UE clock.

The nominal velocity of the GNSS ALA relative to the platform CG due to rotation of the platform is given by:

$$\vec{v}_{ALA,N}^B = \vec{\omega}_N \times \vec{r}_{ALA,N}^B. \quad (12)$$

Referring to FIG. 3, Eq. 12 is implemented by multiplier block 303. The "B" superscript indicates that the corresponding parameter is specified in platform "body" coordinates; i.e., with coordinate axes fixed within the platform body as the reference. A coordinate transformation block 304 converts the ALA velocity $\vec{v}_{ALA,N}^B$ from body coordinates to earth-centered inertial (ECI) coordinates based on the platform nominal attitude $\vec{\theta}_N$, determined as described below. The ALA velocity is added at 305 with the nominal platform CG velocity to generate the nominal velocity of the GNSS APC, $\vec{v}_{APC}$. The nominal position of the APC, $\vec{R}_{APC}$ is generated by integrating (block 308) the nominal ALA velocity $\vec{v}_{ALA,N}$ and adding (block 309) the result to the nominal platform CG position $\vec{R}_{CG}(t)$.

It is assumed in Eq. 12 that the antenna is rigidly attached to the platform and that the platform has a rigid body, i.e. any motion due to structural flexure is neglected. The rotation vector $\vec{\omega}$ is provided by the rotational sensor block 105. Note that even a "static" earth-pointing satellite will rotate at a rate of $2\pi$ radians per orbit period simply due to its orbital motion.

In FIG. 3, the kinematics equations of rotational motion are represented by block 306 and are given by:

$$\dot{\vec{\theta}} = M(\vec{\theta}) \cdot \vec{\omega} \qquad (13)$$

The elements of the matrix M consist of terms of sines and cosines of the angles of $\vec{\theta}$. An integration block 307 generates the nominal attitude $\vec{\theta}_N$ of the platform. As shown in FIG. 3, the rotation vector input to block 306 indicates that the gyro measurements have been adjusted by the nominal gyro bias vector. Filtering of the raw gyro measurements can also be applied to reduce noise, and a model of this filter can likewise be incorporated into the Kalman error state filter 103.

For applications requiring high-precision attitude determination and compensation of rotational motion (e.g. during attitude thrust control), modeling of the rotational dynamics due to torques may be desirable. Likewise, thrust models can be incorporated into the translational motion force models of blocks 110 and 103 if operation during thrust events, such as station keeping, is also desired. Additionally, the APC lever arm estimates can be updated as the platform CG location changes due to propellant consumption.

With respect to the exemplary implementation 300 shown in FIG. 3 of the inertial navigation processing block 104 shown in FIG. 1, it should be noted that only the determination of the nominal motion parameters of the nominal state vector $x_N(t)$ are shown. The other state parameters are relatively static and can be modeled as slowly varying parameters, with dynamic models that can be approximated with $\dot{x}=0$. Some of the parameters (e.g., drag and radiation pressure) have good a priori values, whose nominal values can be modeled as a function of time within a database, and which the Kalman error filter can periodically update.

Measurement Model

In an exemplary embodiment, the rotational motion measurement model is given by:

$$\vec{\omega}_M = \vec{\omega} + \vec{g}_B + \vec{v}_G \qquad (14)$$

In Eq. 14, $\vec{\omega}$ is the true rate of rotation, $\vec{g}_B$ is the rate bias error, and $\vec{v}_G$ is the measurement noise.

The GNSS measurement models for pseudo range (PR) and delta range (DR) associated with GNSS satellites $i=1, 2, \ldots N$, are given by:

$$PR_i^{(t)} = |\vec{R}_{APC}(t_R) - \vec{R}_{GPS\,SVi}(t_T)| + b_u + v_{PR}, \qquad (15)$$

$$DR_i^{(t)} = |\vec{R}_{APC}(t_R) - \vec{R}_{GPS\,SVi}(t_T)| - \Psi_i(t_0) + \int b_u^{dt} + v_{DR}. \qquad (16)$$

Because the DR measurement is derived from tracking the carrier, it tends to be less noisy than the PR measurement, and thus more useful for generating precise velocity information to calibrate the error models. Accumulated Delta Range (ADR) may be used instead of DR. $\Psi_i(t_0)$ corresponds to the initial phase angle and carrier cycle ambiguity. Moreover, in Eqs. 15 and 16 all of the deterministic corrections, including those broadcast in the GNSS signal in space (SIS) navigation message, and the user satellite relativistic correction, are assumed to have been applied and are not explicitly shown.

To improve observability, the models can be generalized to include external or additional measurements providing platform orientation, e.g. star sensor measurements, or multiple GNSS antenna measurement data. In particular, the Kalman filter formulation and models can be expanded to include a complete UTC implementation for both precise navigation and precise attitude determination of the platform.

The motion of the APC in ECI coordinates is given by:

$$\vec{R}_{APC} = \vec{R}_{CG} + \vec{r}_{ALA} \qquad (17)$$

$$\vec{v}_{APC} = \vec{v}_{CG} + \vec{v}_{ALA} \qquad (18)$$

With reference to FIG. 3, Eqs. 17 and 18 are implemented using 309 and 305, respectively.

The rotational motion measurements and ALA state vector are assumed to be modeled in body coordinates, e.g. rate gyros fixed to the platform body. Thus a transformation from body coordinates to ECI coordinates is needed to convert Eq. 12 to ECI coordinates for use in Eqs. 17 and 18.

$$\vec{r}_{ALA}^{ECI} = T(\vec{\theta}) \cdot \vec{r}_{ALA}^B \qquad (19)$$

$$\vec{v}_{ALA}^{ECI} = \dot{\vec{r}}_{ALA}^{ECI} = T(\vec{\theta}) \cdot \vec{\omega}^B \times \vec{r}_{ALA}^B \qquad (20)$$

The elements of the transformation matrix T are products of sines and cosines of the attitude angles $\vec{\theta}$ which relate the orientation of the ECI coordinate system to the platform body coordinate system.

As described above, the dynamics models are given by equations 10-13 and the measurement models are given by equations 14-20. These equations enable propagation of the nominal state, and the linearization of these equations provides the F and H matrices of partial derivatives for use in the generic Kalman error state filter formulation corresponding to equations 5 and 6.

Additional Advantages and Features

Because of its generalized modeling approach and inherent robustness (weak signal sensitivity, sparse measurements and intermittent antenna visibility of individual GNSS satellite capabilities, high Anti-Jam, accommodates rotational motion, etc.) a device in accordance with the present invention is applicable or can be generalized to any satellite orbital application where GNSS signal reception is available, ranging from very low orbits to altitudes extending beyond geosynchronous orbit (GEO).

Moreover, the on-board calibration of drag and radiation pressure models and GNSS antenna lever arm (ALA) modeling enables accurate motion prediction for long intervals of GNSS measurement outages (e.g. interference over a large arc of the satellite orbit), or for the case of sparse measurements (e.g. GEO orbit).

In a further exemplary embodiment, the orbital motion of the platform CG can be approximately predicted using Keplerian orbital models. For applications that do not require accurate prediction or propagation of the platform orbits over long intervals of GNSS measurement outages, Keplerian models can also be used in the Kalman filter. In this case, the Kalman filter model would be based on a Keplerian orbit model, and the Kalman filter would update the Keplerian parameters with each GNSS measurement update.

In a further exemplary embodiment, the orbital dynamics models can be changed based on external logical input of the occurrence of various thrust events (e.g. station keeping).

For some applications (e.g. rotating satellites), the present invention allows attitude and gyro errors to be observable by measuring the GNSS APC motion and velocity modulation relative to the precisely predicted CG velocity.

Apparatus in accordance with the present invention can be used in any satellite system that requires precise on-board orbit estimation to provide a standardized and lower cost alternative for meeting mission objectives. Many satellite systems require orbital knowledge and using GNSS UE for on-board orbit estimation may allow significant reduction on operational costs relative to ground-based tracking. Furthermore, precise on-board GNSS PVT knowledge offers the possibility of performing more processing of raw sensor data on-board to either enhance mission performance (e.g. compensation of sensor data processing for time synch, orbital motion and rotational motion effects), or pre-process the raw data to enable a reduction in satellite uplink and downlink bandwidth data rate requirements.

In general, it is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A global navigation satellite system (GNSS) ultra-tight-coupling (UTC) receiver system for use on a space-borne platform, comprising:
    means for predicting a translational motion of the platform;
    means for sensing a rotational motion of the platform;
    means for determining a nominal trajectory of the platform based on the translational and rotational motions of the platform; and
    a Kalman error state filter means for estimating an error in the nominal trajectory of the platform relative to an actual trajectory of the platform.

2. The receiver system of claim 1, wherein the means for predicting a translational motion of the platform includes means for computing an orbit dynamics force model based on forces to which the platform is subjected.

3. The receiver system of claim 2, wherein the translational motion of the platform is the translation motion of the center of gravity (CG) of the platform.

4. The receiver system of claim 2, wherein the means for determining a nominal trajectory of the platform includes means for performing numerical integration of the orbit dynamics force model and measurements of the rotational motion of the platform.

5. The receiver system of claim 2, wherein the orbit dynamics force model models primary Earth gravity, Earth gravity harmonics, lunar and solar perturbations, drag and radiation pressure.

6. The receiver system of claim 2, wherein the means for determining a nominal trajectory of the platform determines a nominal trajectory of an antenna phase center (APC) of the platform and an antenna lever arm offset relative to the CG of the platform.

7. The receiver system of claim 2, comprising means for resetting the nominal trajectory of the platform to include the error in the nominal trajectory of the platform as estimated by the Kalman error state filter means.

8. The receiver system of claim 1, wherein the means for sensing a rotational motion of the platform includes one or more rotational motion sensors.

9. The receiver system of claim 8, wherein the Kalman error state filter means includes means for estimating the error in the nominal trajectory of the platform in accordance with measurements of the rotational motion of the platform.

10. The receiver system of claim 1, wherein the Kalman error state filter means includes means for estimating the error in the nominal trajectory of the platform in accordance with GNSS satellite ranging measurements.

11. The receiver system of claim 10, comprising drag and radiation pressure models which are updated by the Kalman error state filter means in accordance with the GNSS satellite ranging measurements.

12. The receiver system of claim 1, wherein the Kalman error state filter means includes means for predicting the motion and the error in the nominal trajectory of the platform without GNSS ranging measurements or motion sensor measurements.

13. A method of determining a trajectory of a space-borne platform comprising:
    predicting a translational motion of the platform;
    sensing a rotational motion of the platform;
    determining a nominal trajectory of the platform based on the translational and rotational motions of the platform; and
    estimating an error in the nominal trajectory of the platform relative to an actual trajectory of the platform.

14. The method of claim 13, wherein predicting a translational motion of the platform includes computing an orbit dynamics force model based on forces to which the platform is subjected.

15. The method of claim 14, wherein the translational motion of the platform is the translation motion of the center of gravity (CG) of the platform.

16. The method of claim 14, wherein determining a nominal trajectory of the platform includes performing numerical integration of the orbit dynamics force model and measurements of the rotational motion of the platform.

17. The method of claim 14, wherein the orbit dynamics force model models primary Earth gravity, Earth gravity harmonics, lunar and solar perturbations, drag and radiation pressure.

18. The method of claim 14, comprising resetting the nominal trajectory of the platform to include the estimated error in the nominal trajectory of the platform.

19. The method of claim 13, wherein the error in the nominal trajectory of the platform is estimated in accordance with GNSS satellite ranging measurements.

20. The method of claim 19, wherein drag and radiation pressure models are updated in accordance with the GNSS satellite ranging measurements.

21. The method of claim 19, wherein determining a nominal trajectory of the platform includes determining a nominal trajectory of an antenna phase center (APC) of the platform and an antenna lever arm offset relative to the CG of the platform.

22. The method of claim 13, wherein the error in the nominal trajectory of the platform is estimated in accordance with measurements of the rotational motion of the platform.

23. The method of claim 13, wherein the error in the nominal trajectory of the platform is predicted without GNSS ranging measurements or motion sensor measurements.

* * * * *